United States Patent [19]

Marroquin

[11] 4,444,578
[45] Apr. 24, 1984

[54] PARISON MOLD AND BAFFLE SYSTEM FOR AN AUTOMATIC MOLDING MACHINE

[75] Inventor: Elio G. Marroquin, Monterrey, Mexico

[73] Assignee: Vitro Tec Fideicomiso, Monterrey, Mexico

[21] Appl. No.: 426,647

[22] Filed: Sep. 29, 1982

[51] Int. Cl.³ .............................................. C03B 9/36
[52] U.S. Cl. ........................................ 65/209; 65/219; 65/227; 65/242; 65/300; 65/304
[58] Field of Search ............... 65/127, 209, 219, 220, 65/242, 227, 300, 304

[56] References Cited

U.S. PATENT DOCUMENTS

| | | | |
|---|---|---|---|
| 1,550,152 | 8/1925 | Cramer | 65/242 X |
| 1,654,731 | 1/1928 | Ingle | 65/219 |
| 2,376,602 | 5/1945 | Kinker | 65/242 X |
| 3,403,016 | 9/1968 | Smith | 65/227 |
| 3,536,468 | 10/1970 | Colchagoff | 65/242 X |
| 3,672,860 | 6/1972 | Keller | 65/209 X |

*Primary Examiner*—Arthur D. Kellogg
*Attorney, Agent, or Firm*—Kemon & Estabrook

[57] ABSTRACT

A parison mold and baffle system for an automatic molding machine of I-S type includes a two piece split parison mold with an integral funnel. A combined blow-down and baffle member cooperates with the mold in a first position to perform the blow-down function and then in a second position acts as the bottle bottom end of the mold during the blow-back final shaping of the parison.

5 Claims, 8 Drawing Figures

PARISON MOLD AND BAFFLE SYSTEM FOR AN AUTOMATIC MOLDING MACHINE

BACKGROUND OF THE INVENTION

Traditionally production of glass bottles has been done on I-S machines by the blow and blow process. In this process, it is necessary to shape a parison and bottle neck ring with the parison in an inverted position, after which the parison is inverted to its normal position and placed in a finishing mold where it is blown to its final shape. The parisons are shaped in each of the sections of a plural (usually eight) section machine. A funnel is first connected to the parison mold to receive and guide a gob of molten glass so as to deliver it accurately to the parison mold. Following delivery of the gob, a baffle is connected over the funnel to supply a blow-down to insure that the gob settles to the bottom of the mold to fill the neck ring portion, correctly shape the neck ring and insure uniform contact of the glass with the walls of the parison mold. After the blow-down step, the baffle is disconnected and removed, the funnel is disconnected and removed and finally the baffle is again connected. With the funnel out of the way, the baffle functions as the bottom of the parison during the blow-back from the neck ring end which results in final shaping of the parison.

Any attempt to increase the rate of production of the machines may be broken down into a plurality of time periods as follows:

1. Time of shaping the neck ring

During this time, the funnel is connected to the parison mold, a gob of molten glass is dropped through the funnel into the mold, and the baffle is connected to the funnel to supply blow-down which assures filling of the neck ring mold and shaping of the neck ring.

2. Time of mechanical displacement

The gob of glass remains on the inside of the parison mold while the baffle is connected and withdrawn, the runnel is disconnected and withdrawn and the baffle is again connected.

3. Blow-back time

The parison is blown to conform it to the inside of the parison mold leaving the parison ready for inversion and deposit in the finishing mold for blowing to final shape.

With the present machines, a substantial number of bottles turn out to be defective due to nonuniform distribution of the glass in the walls of the bottles. It has been found that the quality of the bottles may be improved by increasing the blow-back time to insure a good inflation of the parison which results in more uniform distribution of glass in the walls of the bottle. However, in order to increase the blow-back time which previously was considered constant for any given type of bottle, the time for mechanical displacement had to be reduced. Reducing the time of mechanical displacement, however, appeared impossible due to the necessity of disconnecting and removing the baffle from the funnel, disconnecting and removing the funnel and the reconnecting the baffle directly onto the parison mold. Any attempt to speed up these movements of connecting and disconnecting were thought to be impossible because it would result in greater frictional losses between the parts. The conventional I-S machines also have the disadvantage that the baffle performs two functions in each shaping cycle, first by supplying a blow-down and then as a true baffle and any attempt to increase the speed of movements was thought to wear out the actuating mechanism more quickly.

U.S. Pat. No. 3,171,728 of 1965 represents one of the prior art attempts at reducing the length of the mechanical displacement time. In this patent, the upper part of the parison mold is shaped like a funnel in order to receive and guide the molten glass gob. However, instead of performing a blow-down in the upper part of the parison mold to insure good contact of the glass with the parison mold walls, a vacuum is created in the neck ring mold part followed by connecting the baffle to the bottom of the parison mold and performing the blow-back. Unfortunately, however, substituting a vacuum in the neck ring for the blow-down of the prior art did not result in uniform contact of the glass with the walls of the parison mold because there was a tendency for the glass to trap air bubbles between it and the parison mold walls which impedes uniform distribution of the glass.

Another prior art attempt to solve these problems may be found in U.S. Pat. No. 3,536,468 of 1970. In this patent, a unitary structure includes the parison molds and a funnel which are also connected with a mechanism for blow-down and spraying of lubricant onto the inside of the parison mold. In this way, the need to connect and disconnect the funnel is obviated and therefore, in a single operation the apparatus will guide, lubricate and perform blow-down. Such apparatus has the advantage that the funnel is connected with the mechanism for blow-down and spraying of lubricant and both are connected as a unit to the parison mold, so that only two operations are necessary, namely, to connect the baffle and perform blow-back. However, this apparatus suffers from being too heavy and bulky for fast movements and thus requires a movement time which is greater than in the standard machines. In addition, the design is somewhat complicated and has wear problems which make it relatively expensive to operate.

A similar showing may be found in U.S. Pat. No. 3,672,860 of 1972 with the difference that a lubricant spray nozzle is included which is shaped to fit a parison mold with a noncircular crosssection to premold the gob and produce parisons and bottles with a noncircular crosssection.

BRIEF SUMMARY OF THE INVENTION

The above and other disadvantages of the prior art are completely overcome by the improved system of the present invention for shaping parisons in the production of glass bottles. In accordance with the present invention, a funnel is an integral upper part of the parison mold for guiding and or preshaping a gob of molten glass. A double action baffle is employed which by its entry-exit mechanism is connected to the funnel to provide in a first phase a blow-down assuring uniform contact of the glass with the inner walls of the parison mold and proper shaping of the bottle neck ring, and in the second phase acts as a baffle which has its lower part shaped in the form of the parison bottom to permit shaping of the parison when the blow-back of the gob is performed. The baffle by being adjustably connected to the funnel eliminates the need for connecting and disconnecting the compression head on the funnel for shaping of the bottle neck ring and connecting and disconnecting of the baffle for shaping of the parison. The time for shaping of the parison is reduced to a single entry and exit movement of the baffle which reduces wear of the mechanisms and improves the quality of the parison by providing a longer blow-back time to effect better distribution of the glass in the parison mold. This in turn by reducing the mechanical displacement time permits faster shaping cycles and increased production rate of better quality bottles.

DETAILED DESCRIPTION OF THE INVENTION

Figure 1:
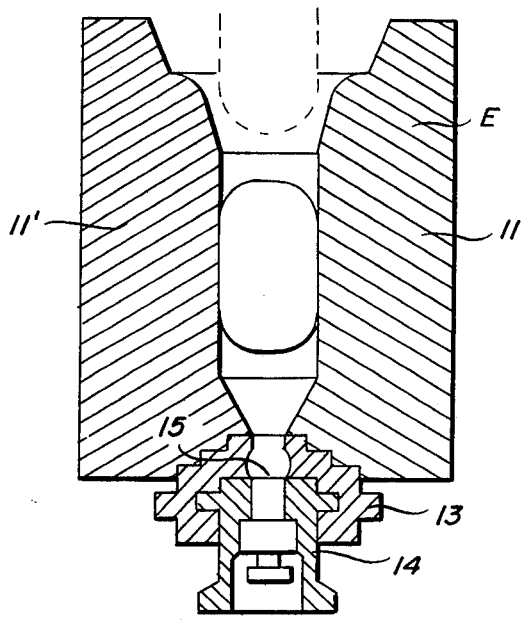
FIG. 1 is a sectional view of the integral funnel and parison mold.

Referring first to FIG. 1, a combined parison mold and funnel is designated generally by the reference numeral 10. The mold is of the split type, one half being indicated at 11 and the other at 11' while the funnel portion is indicated at E. At the lower end of the mold and as is conventional, there is a neck ring mold holder 13 and a blow-back nozzle 14 within which is a centrally disposed retractable piston 15. Also shown in this view is a dotted line showing of a falling gob about to pass through the funnel E and in full line the same gob is shown having passed through the funnel and proceeded about half way down the mold.

Figure 2:
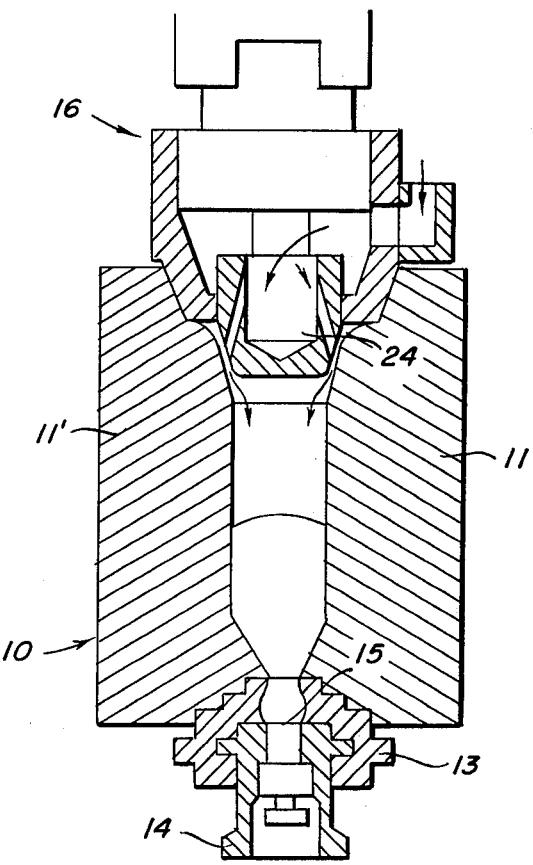
FIG. 2 is a view similar to FIG. 1 showing the baffle positioned for shaping of the neck ring.
Figure 3:
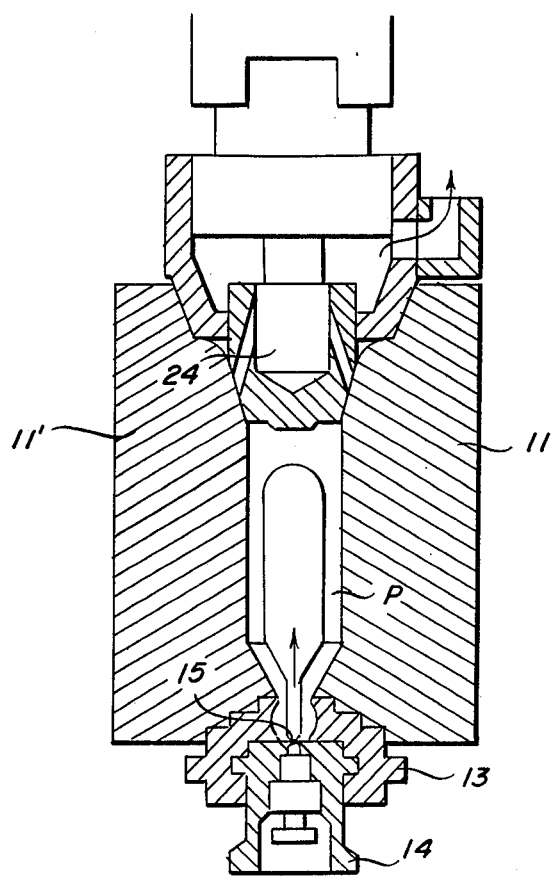
FIG. 3 is a view similar to FIG. 2 showing the baffle positioned for final shaping of the parison.

Referring next to FIG. 2, the baffle of the present invention is indicated generally by the numeral 16 and is shown in the initial or blow-down position. In FIG. 3, the baffle is in its lower or blow-back position.

Figure 4:
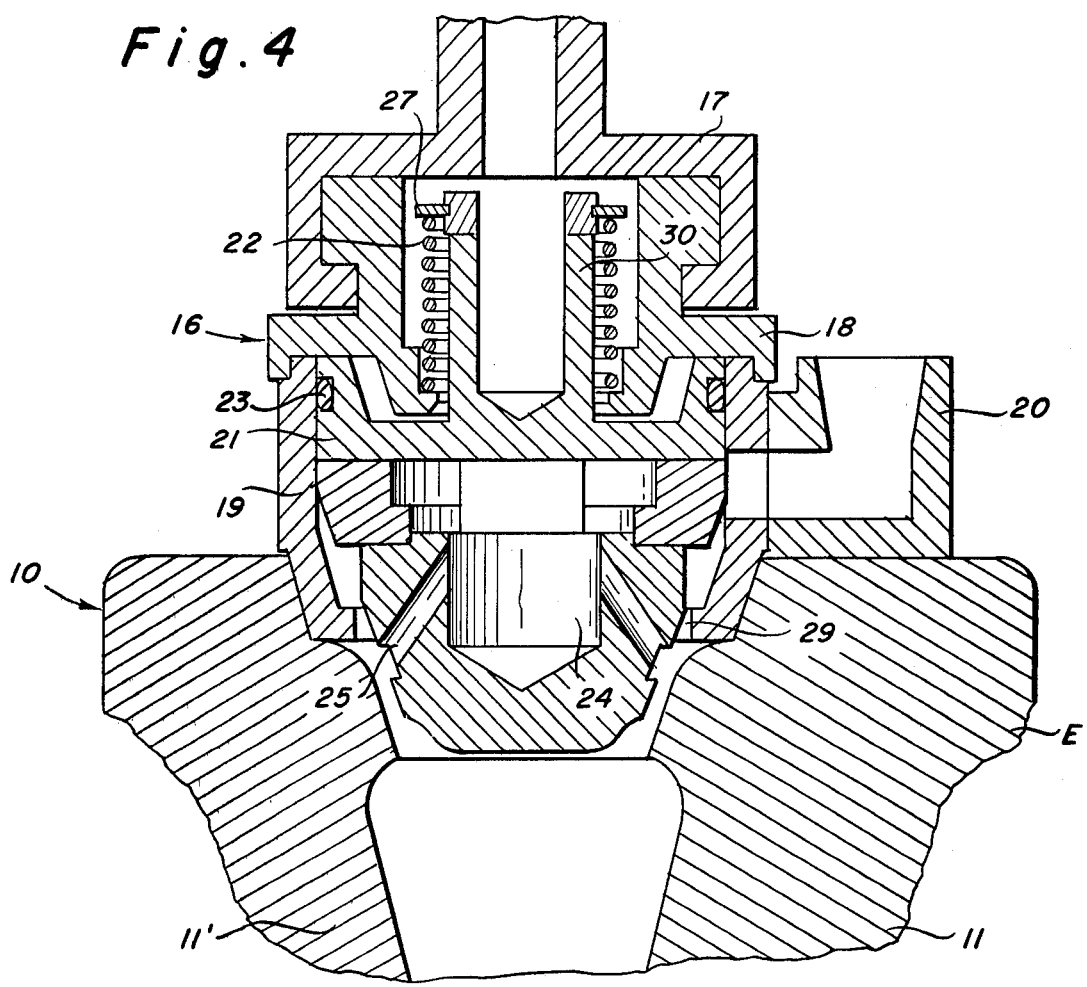
FIG. 4 is a detailed sectional view of the baffle shown in FIGS. 2 and 3 and positioned as shown in FIG. 2.
Figure 6:
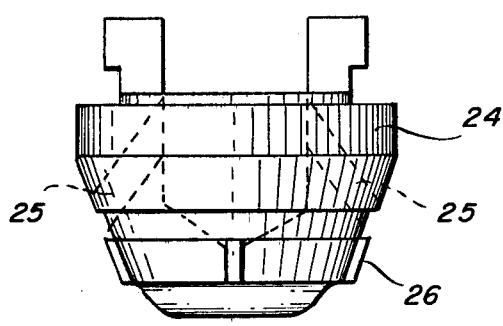
FIG. 6 is a sectional view of an interchangeable baffle head shown in FIGS. 4 and 5.
Figure 8:
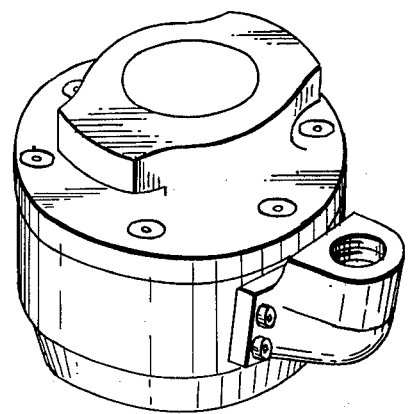
FIG. 8 is a perspective view of a portion of the apparatus of FIG. 7.
Figure 5:
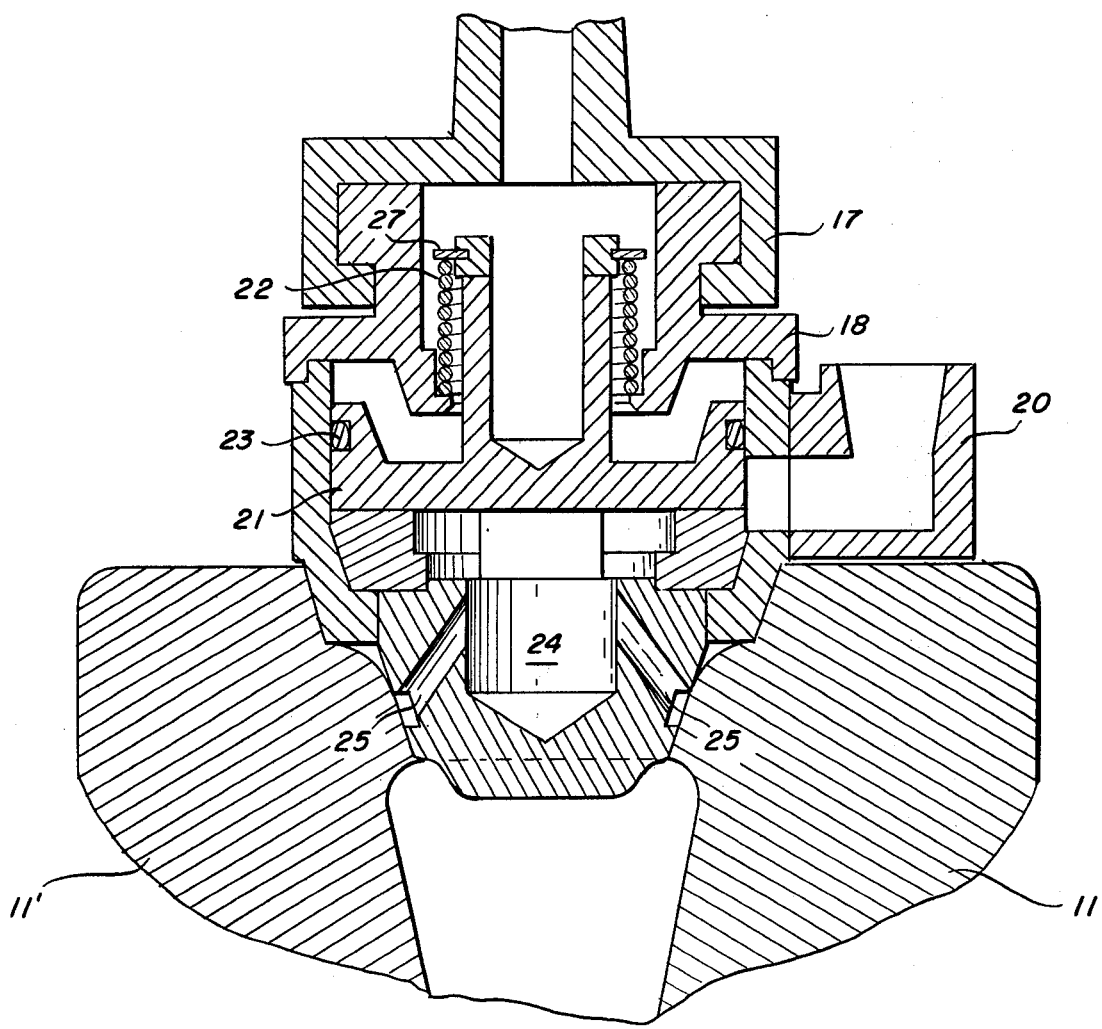
FIG. 5 is a view similar to FIG. 4 but showing the baffle positioned for final shaping of the parison.

FIGS. 4 and 5 correspond essentially to FIGS. 2 and 3 except that the baffle is shown in more detail and the lower portion of the parison mold is omitted. Referring first to FIG. 4, the baffle of the present invention is shown supported on the head holder 17 of a baffle arm (not shown). The baffle includes a cap member 18 and a cylinder 19 the lower portion of which mates smoothly with the uppermost part of the funnel portion E of the parison mold for both the blow-down and blow-back operations. The cylinder 19 has on its outer surface a connector member 20 which permits entry of air for the blow-down operation and exit of air for the blow-back operation. A piston 21 having an integral piston rod 30 is mounted within the cylinder 19 for reciprocating movement therein. At the lower end of the piston 21 there is a member 24 having blow-down air passages 25 and which member is configured when lowered into the position shown in FIG. 5 to completely close the end of the mold cavity. With the cylinder 19 in engagement with the funnel entrance of the mold as shown in FIG. 4, the piston is normally held in the position shown in this Figure by means of the spring 22 which surrounds the piston rod 30. Following blow-down, which is achieved by forcing air from the connector 20 through the inside passages 25 through clearance 29 and which insures that the glass fills the neck ring portion of the mold, air is the admitted through the baffle arm in order to move the piston 21 downwardly into the position shown in FIG. 5. In this position, the end cavity of the mold is completely sealed by the member 24 on actioning the piston 21 and final shaping of the parison is achieved by the well known blow-back operation which involves the admission of air under pressure through the blow-back nozzle 14. As shown more clearly in FIG. 6, the lower end of the piston also includes vents 26 which permit escape of air during blow-back which then goes through the inside passages 25 and exits through the connector 20.

Figure 7:
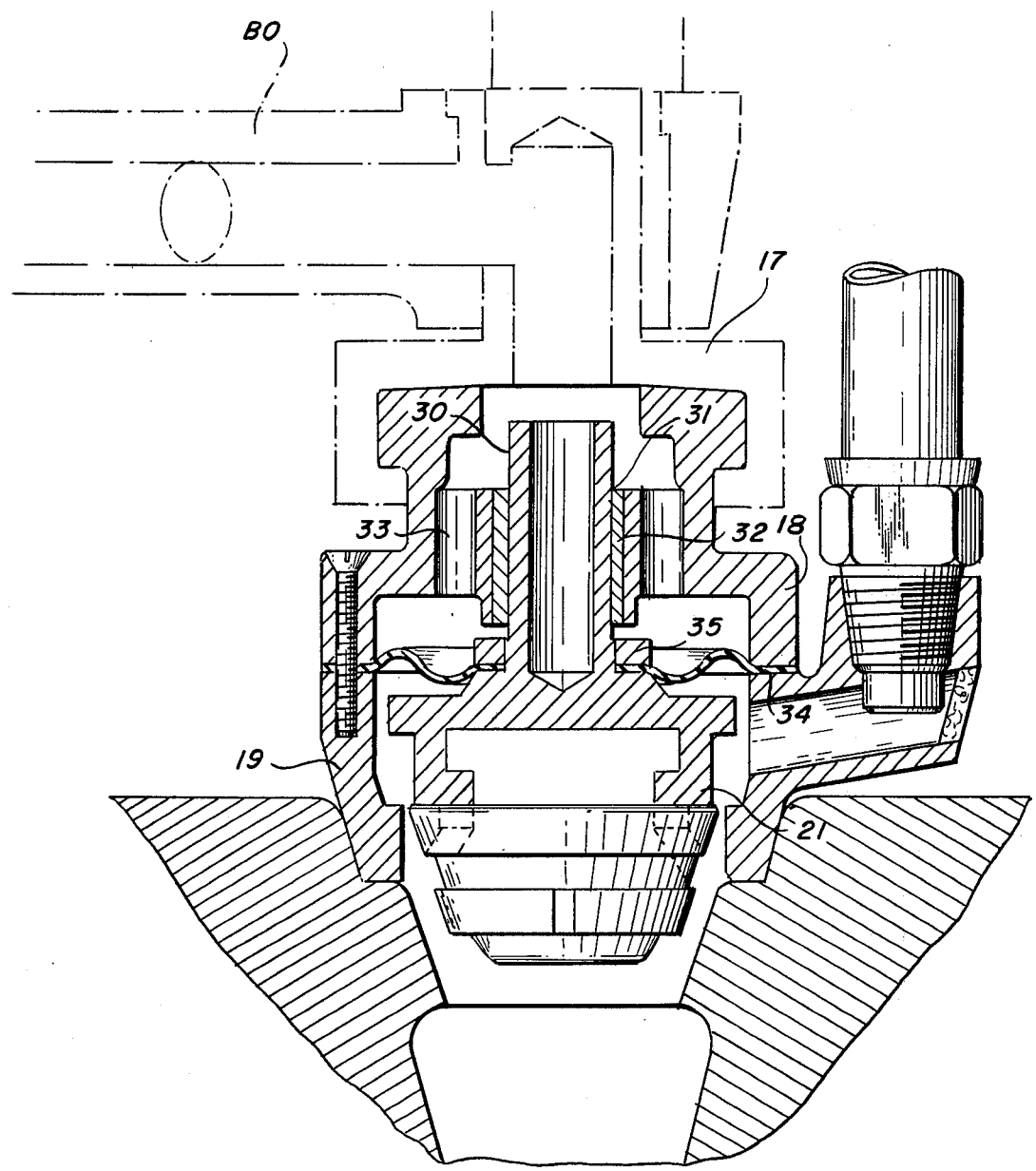
FIG. 7 is a sectional view of an alternative embodiment of the present invention.

FIG. 7 shows an alternative embodiment of the present invention which functions however in substantially identical manner to the embodiment previously described. In FIG. 7, it will be seen that a diaphragm 34 clamped between the cap 18 and the cylinder 19 on its outer periphery and by means of an interference ring 35 to the piston 21 on its inner periphery takes the place of the spring in the other embodiment. To move the piston 21 into blow-back position closing the mold, air is admitted through the baffle arm BO and via the central perforations 31 and additional perforations 33 acts on the upper surface of the diaphragm to move the piston into engagement with the mold.

While preferred embodiments of the present invention have been herein shown and disclosed, applicant claims the benefit of a full range of equivalents within the scope of the appended claims:

I claim:

1. In an automatic glass molding machine of the I-S type, a two part split parison mold includes, at the bottle bottom end, an integral funnel for shaping and guiding a molten glass gob into the mold;

a baffle and blow-down head including a piston and cylinder assembly, the lower outer wall of said cylinder conforming to the upper inner wall of said mold, said piston when said cylinder and mold are in engagement being normally biased to a position out of engagement with the inner surface of said funnel for performing the blow-down operation; and means for moving said piston into engagement with the inner wall of said funnel and closing the bottle bottom end of the mold during blow-back final shaping of the parison.

2. The combination defined by claim 1 including a helical spring member interconnecting said piston and cylinder to bias said piston inwardly of said cylinder.

3. The combination defined by claim 1 including a diaphragm interconnecting said piston and cylinder to bias said piston inwardly of said cylinder.

4. The combination defined by claim 1 in which said piston includes air passages extending therethrought for transmitting air under pressure during the blow-down operation.

5. The combination defined by claim 1 in which said piston includes an interchangeable baffle member in its lower end.

* * * * *

UNITED STATES PATENT AND TRADEMARK OFFICE
CERTIFICATE OF CORRECTION

PATENT NO. : 4,444,578
DATED : April 24, 1984
INVENTOR(S) : ELIO G. MARROQUIN

It is certified that error appears in the above—identified patent and that said Letters Patent is hereby corrected as shown below:

On the title page the following should be added:

-- [30] FOREIGN APPLICATION PRIORITY DATA

October 9, 1981  [MX]  Mexico............189577 --.

Signed and Sealed this

Thirtieth Day of October 1984

[SEAL]

Attest:

GERALD J. MOSSINGHOFF

Attesting Officer

Commissioner of Patents and Trademarks